US006682332B2

(12) United States Patent
Pfahl

(10) Patent No.: US 6,682,332 B2
(45) Date of Patent: Jan. 27, 2004

(54) DUAL ISOLATED MODE CONTROLLER FOR INJECTION MOLDING MACHINE

(75) Inventor: Douglas S. Pfahl, Middleburg Heights, OH (US)

(73) Assignee: Alcoa Inc., Pittsburgh, PA (US)

(*) Notice: Subject to any disclaimer, the term of this patent is extended or adjusted under 35 U.S.C. 154(b) by 138 days.

(21) Appl. No.: 09/929,219

(22) Filed: Aug. 14, 2001

(65) Prior Publication Data

US 2003/0035854 A1 Feb. 20, 2003

(51) Int. Cl.[7] .............................................. B29C 45/77
(52) U.S. Cl. ..................... 425/145; 264/40.1; 264/40.5; 425/149; 425/170
(58) Field of Search .............................. 264/40.1, 40.5; 425/145, 149, 169, 170

(56) References Cited

U.S. PATENT DOCUMENTS 5,529,478 A    6/1996   Siegrist et al. .............. 425/150
5,738,809 A    4/1998   Hara et al. .................. 264/40.5
5,817,258 A   10/1998   Ito et al. ..................... 264/40.1

FOREIGN PATENT DOCUMENTS

EP    0528040    2/1993
EP    0897786    2/1999

Primary Examiner—Tim Heitbrink
(74) Attorney, Agent, or Firm—Webb Ziesenheim Logsdon Orkin & Hanson, P.C.

(57) ABSTRACT

An injection molding apparatus includes a control system for controlling the injection of fluid molding material during an injection cycle. The control system includes a controller for generating control signals and a servo control circuit responsive to the control signals for controlling the injection of the fluid molding material. The servo control circuit implements a first control mode which controls only a velocity of the fluid molding material during a first part of the injection cycle and a second control mode which controls only a pressure of the fluid molding material during a second part of the injection cycle.

19 Claims, 10 Drawing Sheets

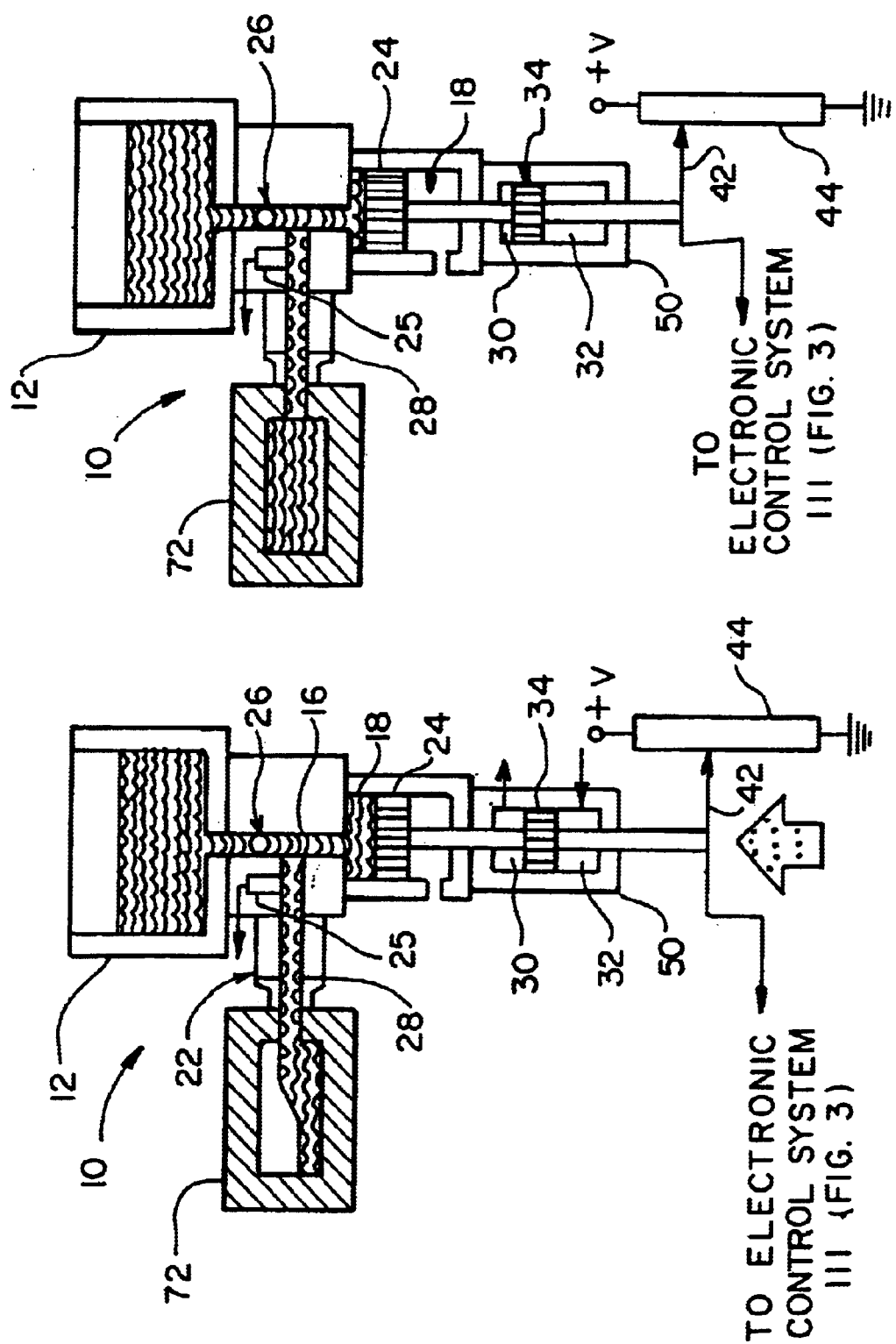

DUAL ISOLATED MODE CONTROLLER FOR INJECTION MOLDING MACHINE

BACKGROUND OF THE INVENTION

1. Field of the Invention

The present invention relates to an improved servo control circuit for controlling the operation of an injection molding apparatus.

2. Description of the Prior Art

The present invention is an improvement of the servo control circuit described in U.S. Pat. No. 5,316,707 to Stanciu et al., which issued on May 31, 1994 (hereinafter "the '707 patent") which is incorporated herein by reference.

The '707 patent discloses an injection molding apparatus which is controlled by a control system for controllably injecting fluid molding material into a die. The control system disclosed in the '707 patent includes, among other things, a programmable logic controller (PLC) and a servo control circuit. The servo control circuit receives control signals from the PLC and receives feedback signals from the injection molding apparatus related to the pressure of the fluid molding material in the die and the velocity the fluid molding material is injected into the die. The servo control circuit combines the input signals and the feedback signals in a manner that enables the fluid molding material to be injected into the die in a reliable, repeatable manner.

A problem with this servo control circuit is that during a first part of an injection cycle a pressure feedback signal related to the pressure of the fluid molding material in the die interferes with the attainment of the maximum injection velocity of the fluid molding material into the die even though the actual pressure of the fluid molding material in the die is at or near atmospheric pressure. Moreover, during a second part of the injection cycle, a velocity feedback signal related to the velocity the fluid molding material is injected into the die interferes with the maintenance of a constant pressure of the fluid molding material in the die even though the fluid molding material in the die is not moving. Still another problem with the control system disclosed in the '707 patent is the inability to switch the control mode implemented by the servo control circuit to optimize the velocity of the injected fluid molding material during the first part of the injection cycle and/or the maintenance of the pressure of the fluid molding material in the die during the second part of the injection cycle.

One attempt at overcoming these problems included programming the PLC to selectively control a transfer point between the first part of the injection cycle where only the injection velocity of the fluid molding material into the die is controlled and the second part of the injection cycle where only the pressure of the fluid molding material in the die is controlled. A problem with this solution, however, is that a typical PLC does not have a sufficiently short loop control time in order to enable it to control the injection molding cycle with the precision needed. Moreover, in this embodiment, the pressure feedback signal still adversely affected the velocity of the injected fluid molding material during the first part of the injection cycle and the velocity feedback signal still adversely affected the pressure of the fluid molding material during the second part of the injection cycle.

It is, therefore, an object of the present invention to overcome the above problems and others by providing an improved servo control circuit that is responsive to control signals from the PLC for controlling the injection cycle whereby the control circuit implements a first control mode which controls only a velocity of the fluid molding material during a first part of the injection cycle and a second control mode which controls only a pressure of the fluid molding material during a second part of the injection cycle. Still other objects will become apparent to those of ordinary skill in the art upon reading and understanding the following detailed description.

SUMMARY

Accordingly, I have invented an injection molding apparatus including means for injecting fluid molding material into a die and a control system for controlling the means for injecting. The control system includes a programmable logic controller (PLC) for generating control signals and a servo control circuit responsive to the control signals for implementing an integral only control mode or a proportional only control mode for controlling the injecting means during an injection cycle wherein, during a first part of the injection cycle, the servo control circuit operates in the integral only control mode and during a second part of an injection cycle the servo control circuit operates in the proportional only control mode.

I have also invented an injection molding apparatus including a moveable injection ram for urging fluid molding material into a die. The movement of the injection ram is controlled by a software controlled controller and a servo control circuit which senses movement of the injection ram and a pressure of the fluid molding material in response to the injection ram urging the fluid molding material into the die during an injection cycle. The servo control circuit is responsive to the controller for controlling only a velocity of the injection ram during a first part of the injection cycle and for controlling only a pressure the injection ram exerts on the fluid molding material during a second part of the injection cycle.

Lastly, I have invented an injection molding apparatus that includes means for injecting fluid molding material into a die and a control system for controlling the means for injecting. The control system includes a controller for generating control signals and a servo control circuit responsive to the control signals for controlling the injecting means. The servo control circuit implements an integral control mode which controls only a velocity of the injecting means during a first part of the injection cycle and a proportional control mode which controls only a pressure exerted by the injecting means on the fluid molding material during a second part of the injection cycle.

During the first part of the injection cycle, when the die is initially being filled with fluid molding material, the servo control circuit is responsive to the velocity the fluid molding material is being injected into the die and a reference pressure signal, but not an actual pressure of the fluid molding material, for causing the injecting means to inject the fluid molding material into the die at a velocity related to the actual velocity signal. During the second part of the injection cycle, when the die is substantially filled with fluid molding material, the servo control circuit is responsive to the actual pressure of the fluid molding material in the die and a reference velocity signal, but not the actual velocity of the fluid molding material, for causing the injecting means to maintain the pressure of the fluid molding material at a pressure related to the actual pressure of the fluid molding material in the die.

The servo control circuit can include a switched integrator responsive to the actual velocity of the fluid molding material during the first part of the injection cycle and the reference velocity signal during the second part of the injection cycle for controlling the injecting means during the injection cycle. The switched integrator switches between an integrating mode during the first part of the injection cycle and a buffered reference mode during the second part of the injection cycle.

The servo control circuit preferably includes a velocity feedback isolation circuit responsive to the actual pressure of the fluid molding material and an external reference pressure signal for causing the servo control circuit to change from the first part of the injection cycle to the second part of the injection cycle when the actual pressure signal during the injection cycle achieves a predetermined relation to the external pressure reference signal.

Lastly, the servo control circuit preferably includes a pressure error circuit responsive to the actual pressure signal and the response of the velocity feedback isolation circuit to the actual pressure signal and the external reference pressure signal for outputting a pressure control signal related to the actual pressure signal or the external reference pressure signal.

BRIEF DESCRIPTION OF THE DRAWINGS

FIGS. 2A–2D are partial diagrammatic sectional views of the injection molding apparatus shown in FIG. 1 showing various steps of an injection cycle;

DETAILED DESCRIPTION OF THE INVENTION

The present invention will be described with reference to the accompanying figures where like reference numbers correspond to like elements.

Figure 1:
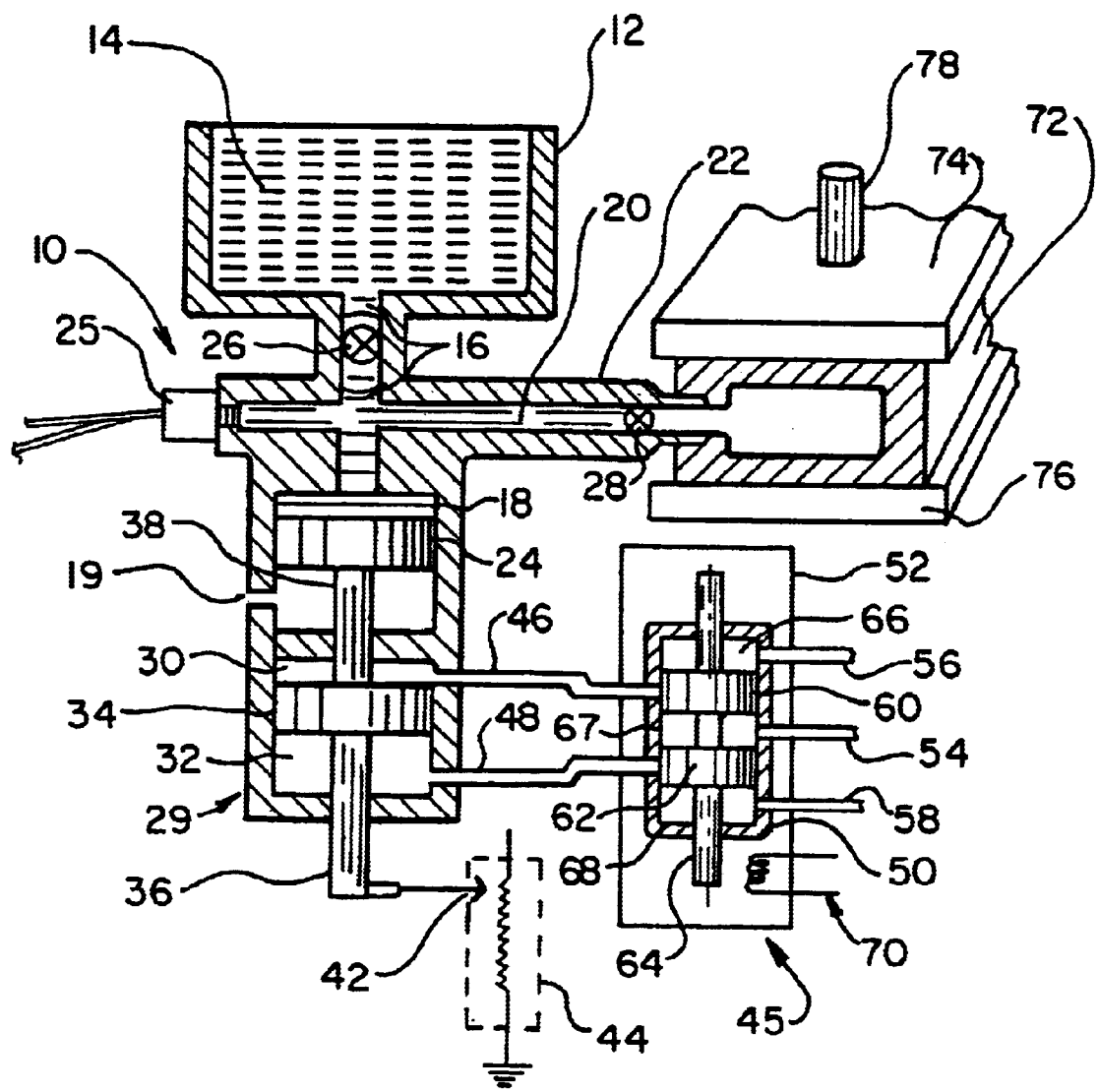
FIG. 1 is a diagrammatic sectional view of an injection molding apparatus.

With reference to FIG. 1, an injection molding apparatus 10 includes a reservoir 12 which holds a fluid molding material 14, such as a molding wax. In the illustrated embodiment, reservoir 12 is open to the atmosphere. A heating and/or agitating means (not shown) may be disposed in reservoir 12 to maintain fluid molding material 14 in a fluid condition and at a temperature suitable for injection molding. A fluid passage 16 fluidly communicates reservoir 12 to a chamber 18 and a fluid channel 20 formed in a movable injection nozzle 22. An injection ram 24 is moveable in chamber 18 for acting on fluid molding material 14 therein. A first valve 26 is positioned in fluid passage 16. Valve 26 selectively controls the flow of fluid molding material from reservoir 12 into chamber 18. A second valve 28 is positioned in fluid chamber 20 of injection nozzle 22. Second valve 28 selectively controls the flow of fluid molding material 14 through injection nozzle 22.

A pressure transducer 25 is coupled in fluid communication with fluid channel 20 of injection nozzle 22. Pressure transducer 25 outputs a signal related to the pressure of fluid molding material 14 in injection nozzle 22. This signal can be used to control an injection cycle of injection molding apparatus 10.

With valve 26 in its open state and with valve 28 in its closed state, fluid molding material 14 is drawn into chamber 18 and channel 20 when injection ram 24 is retracted downwardly in chamber 18. A hydraulic system 29 is utilized to retract injection ram 24. Hydraulic system 29 includes hydraulic chambers 30 and 32 separated by a piston 34 connected to piston rods 36 and 38. Piston rod 38 is connected to injection ram 24 such that movement of piston 34 causes a corresponding movement of injection ram 24 within chamber 18. Chamber 18 includes a vent 19 for exhausting and drawing atmosphere into chamber 18 on a side of injection ram 24 opposite channel 20. This exhausting and drawing of atmosphere into chamber 18 facilitates movement of injection ram 24 within chamber 18. Movement of piston 34 also causes a corresponding movement of piston rod 36. An end of piston rod 36 opposite piston 34 is coupled to a slider arm 42 which is connected between piston rod 36 and a linear potentiometer 44. Piston rod 36, slider arm 42 and potentiometer 44 coact to provide an indication of the position of piston arm 36 and, hence, the position of injection ram 24.

Hydraulic system 29 includes a hydraulic pump (not shown) and a hydraulic control system 45 which includes hydraulic feed conduits 46 and 48 in fluid communication between the hydraulic pump and hydraulic chambers 30 and 32, respectively, via a hydraulic valve housing 50 of a servo valve assembly 52. A spool valve 64 is received in hydraulic valve housing 50. Spool valve 64 includes two spool elements 60 and 62 in spaced relation and positioned to divide hydraulic valve housing 50 into three chambers 66, 67 and 68. Chamber 67 is coupled in fluid communication with a supply conduit 54 and chambers 66 and 68 are coupled in fluid communication with exhaust conduits 56 and 58, respectively. Supply conduit 54 and exhaust conduit 56 and 58 are coupled in fluid communication with the hydraulic pump (not shown).

An injection servo coil 70 is operatively positioned adjacent spool valve 64 and is coupled to a control system, described hereinafter, which controls the energization of injection servo coil 70 to cause spool valve 64 to move upward or downward within valve housing 50. When spool valve 64 is moved to its upper position within valve housing 50, supply conduit 54 is in fluid communication with feed conduit 46 and exhaust conduit 58 is in fluid communication with feed conduit 48. In contrast, when spool valve 64 is in its lower position in valve housing 50, supply conduit 54 is in fluid communication with feed conduit 48 and exhaust conduit 56 is in fluid communication with feed conduit 46. Thus, by selectively moving spool valve 64 between its upper position and its lower position, the supply of hydraulic fluid to hydraulic chambers 30 and 32 can be controlled to extend and retract piston 34 and, hence, injection ram 24.

In operation of injection molding apparatus 10, injection nozzle 22 is positioned within an opening of a mold die 72 which may be sandwiched between an upper platen 74 and a lower platen 76. A hydraulic actuated jack 78 may be utilized to advance and withdraw upper platen 74 toward and away from lower platen 76.

Figures 2A, 2B:
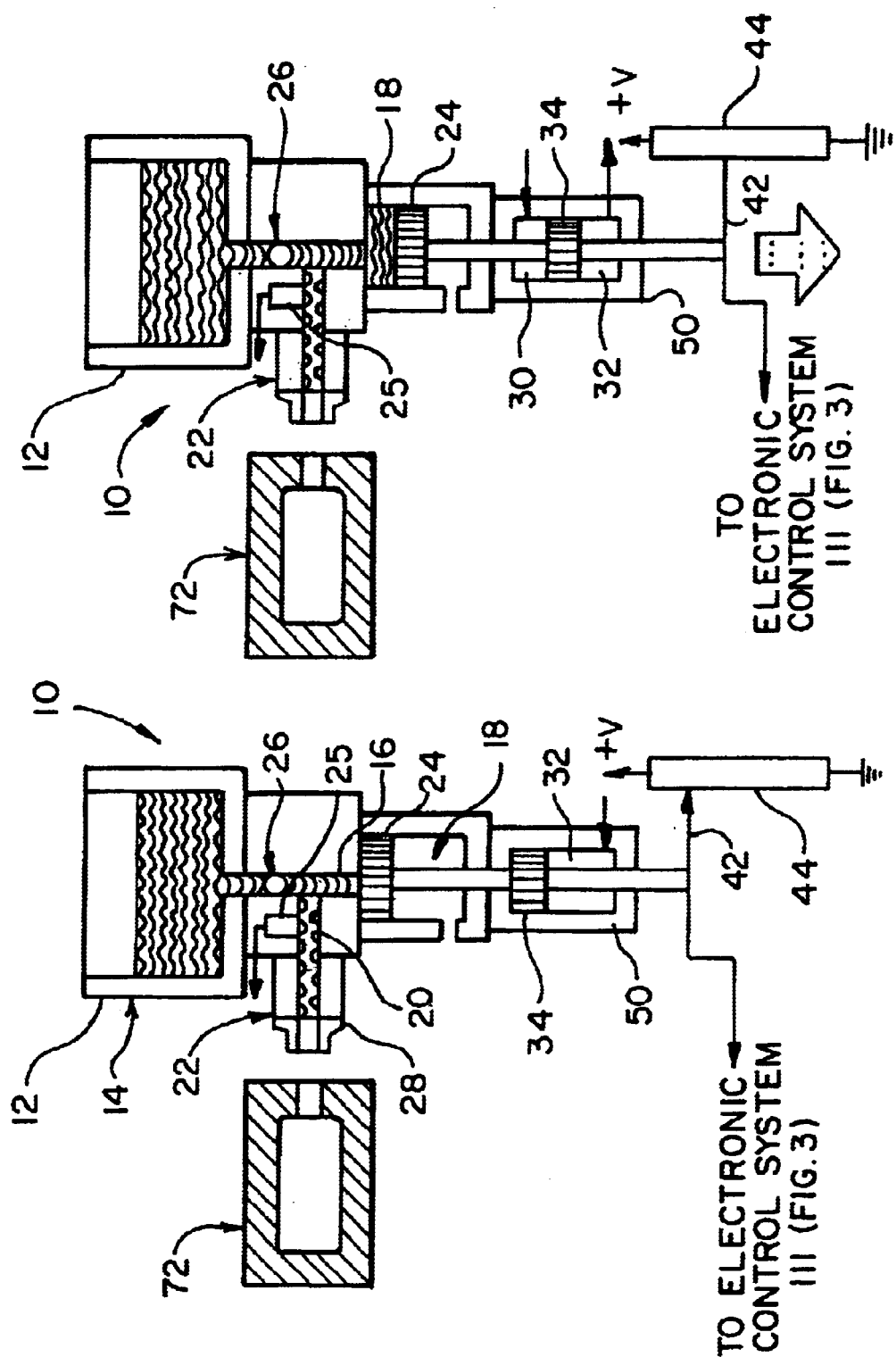

With reference to FIGS. 2A–2D and with continuing reference to FIG. 1, the operation of injection molding apparatus 10 will now be described. In FIG. 2A, the initial "at rest" position of injection molding apparatus 10 is shown where fluid molding material 14 is maintained in a liquidified state within reservoir 12. Valve 26 is opened to enable fluid molding material 14 to flow into passage 16 and channel 20. However, valve 28 is closed to prevent fluid molding material 14 from flowing through injection nozzle 22.

In response to the introduction of pressurized hydraulic fluid into hydraulic chamber 32, piston 34 urges injection ram 24 into its fully extended position, shown in FIG. 2A, whereupon the flow of fluid molding material 14 from passage 16 into chamber 18 is inhibited. The position of injection ram 24 is monitored by linear potentiometer 44 which supplies a position signal indicative of the position of injection ram 24 to an electronic control system 111, shown in FIG. 3. The pressure of fluid molding material 14 in injection nozzle 22 is monitored by pressure transducer 25 which supplies the signal indicative of the pressure of fluid molding material 14 in channel 20 to electronic control system 111. In FIG. 2A, injection mold die 72 is not coupled to injection nozzle 22. The status of injection molding apparatus 10 shown in FIG. 2A may be maintained indefinitely.

Upon initiation of an injection cycle, the hydraulic pump and hydraulic control system 45 coact to supply pressurized hydraulic fluid to chamber 30 and to withdraw hydraulic fluid from chamber 32 whereupon piston 34 moves downwardly as shown in FIG. 2B. In response to piston 34 moving downwardly, injection ram 24 moves downwardly drawing fluid molding material 14 into chamber 18. The volume of fluid molding material 14 received in chamber 18 can be calibrated to a position of slider arm 42 on linear potentiometer 44.

When chamber 18 is filled with a desired volume of fluid molding material 14, mold die 72 is coupled to injection nozzle 22 as shown in FIG. 2C. Next, valve 26 is closed and valve 28 is opened and fluid molding material 14 in chamber 18 is injected into mold die 72. More specifically, once valve 26 is closed and valve 28 is opened, pressurized hydraulic fluid is introduced into chamber 32 and hydraulic fluid is exhausted from chamber 30 of hydraulic valve housing 50. In response to pressurized hydraulic fluid entering chamber 32, piston 34 and, hence, injection ram 24 move upwardly. In response to upward movement of injection ram 24, fluid molding material 14 in chamber 18 is forced through channel 20 and injection nozzle 22 into mold die 72.

The position of injection ram 24 can be monitored via linear potentiometer 44 and the pressure of fluid molding material 14 in channel 20 can be monitored by pressure transducer 25. The acceleration and/or speed that injection ram 24 moves upwardly can be derived from the time rate of change of the resistance of linear potentiometer 44 measured by electronic control system 111. This acceleration and/or speed can be controlled so that fluid molding material 14 can be injected into mold die 72 at a preselected flow rate and/or acceleration. As the mold cavity of mold die 72 becomes filled with fluid molding material 14, the pressure of fluid molding material 14 can be monitored by electronic system 111 via pressure transducer 25 for precise control of the injection cycle.

As shown in FIG. 2D, the injection cycle is continued until mold die 72 is completely filled whereupon a preselected pressure may be maintained on fluid molding material 14 injected into die 72 during a solidification cycle.

The quality and uniformity of molded patterns are directly related to the ability of injection molding apparatus 10 to accurately control the injection cycle, especially the dynamics of fluid flow and pressure. The broad variation in size, geometry and orientation of various mold dies 72 require that injection molding apparatus 10 control flow characteristics and injection pressure. More specifically, since some mold patterns are molded around fragile ceramic cores to produce hollow castings, precise control is required of the acceleration, flow and pressure of fluid molding material 14 to eliminate breakage of the ceramic cores which may be caused by excessive pressure or flow. Additionally, the absence of adequate flow control and pressure may result in pattern imperfections such as air entrapment, flow lines, knit lines, cracking, incomplete fill, sink or cavitation, incorrect size, core breakage, and various other imperfections causing the pattern to be unusable.

Figure 3:
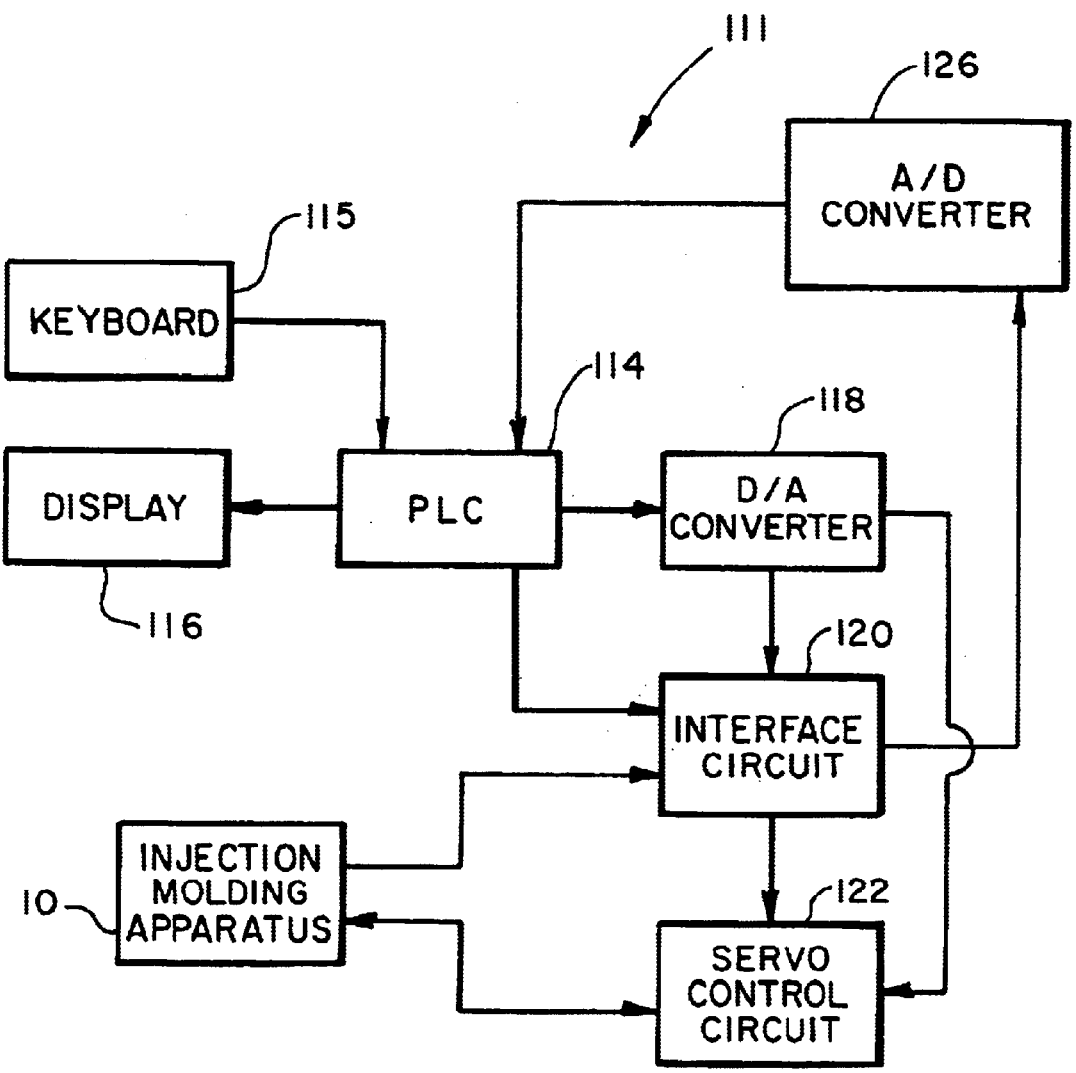
FIG. 3 is a block diagram of a control system of the injection molding apparatus shown in FIG. 1.

With reference to FIG. 3 and with continuing reference to all previous Figures, to overcome the above problems, injection molding apparatus 10 includes electronic control system 111 for controlling acceleration, flow velocity, pressure and other parameters with a high degree of accuracy throughout the injection and solidification cycles. Electronic control system 111 includes a programmable logic controller (PLC) 114 connected to receive input from a keyboard 115 and connected to a display 116 for displaying data related to the programming and/or operation of PLC 114. A digital to analog (D/A) converter 118 is connected to convert digital signals received from PLC 114 into analog signals which are supplied to an interface circuit 120 and a servo control circuit 122. Interface circuit 120 also receives digital signals from PLC 114.

Interface circuit 120 processes the analog signals received from D/A converter 118 and the digital signals received from PLC 114 to produce analog signals which are supplied to an analog to digital (A/D) converter 126 and digital signals which are supplied to servo control circuit 122.

Servo control circuit 122 receives the digital signals from interface circuit 120 and analog signals from D/A converter 118. Servo control circuit 122 processes these digital and analog signals and controls injection molding apparatus 10 based on these digital and analog signals. More specifically, servo control circuit 122 processes these digital and analog signals to implement a integral (I) and proportional (P) only control system which is utilized to control the operation of injection molding apparatus 10.

A/D converter 126 processes analog signals received from interface circuit 120 into digital signals which are supplied to PLC 114 for use in controlling the operation of injection molding apparatus 10.

Figure 4:
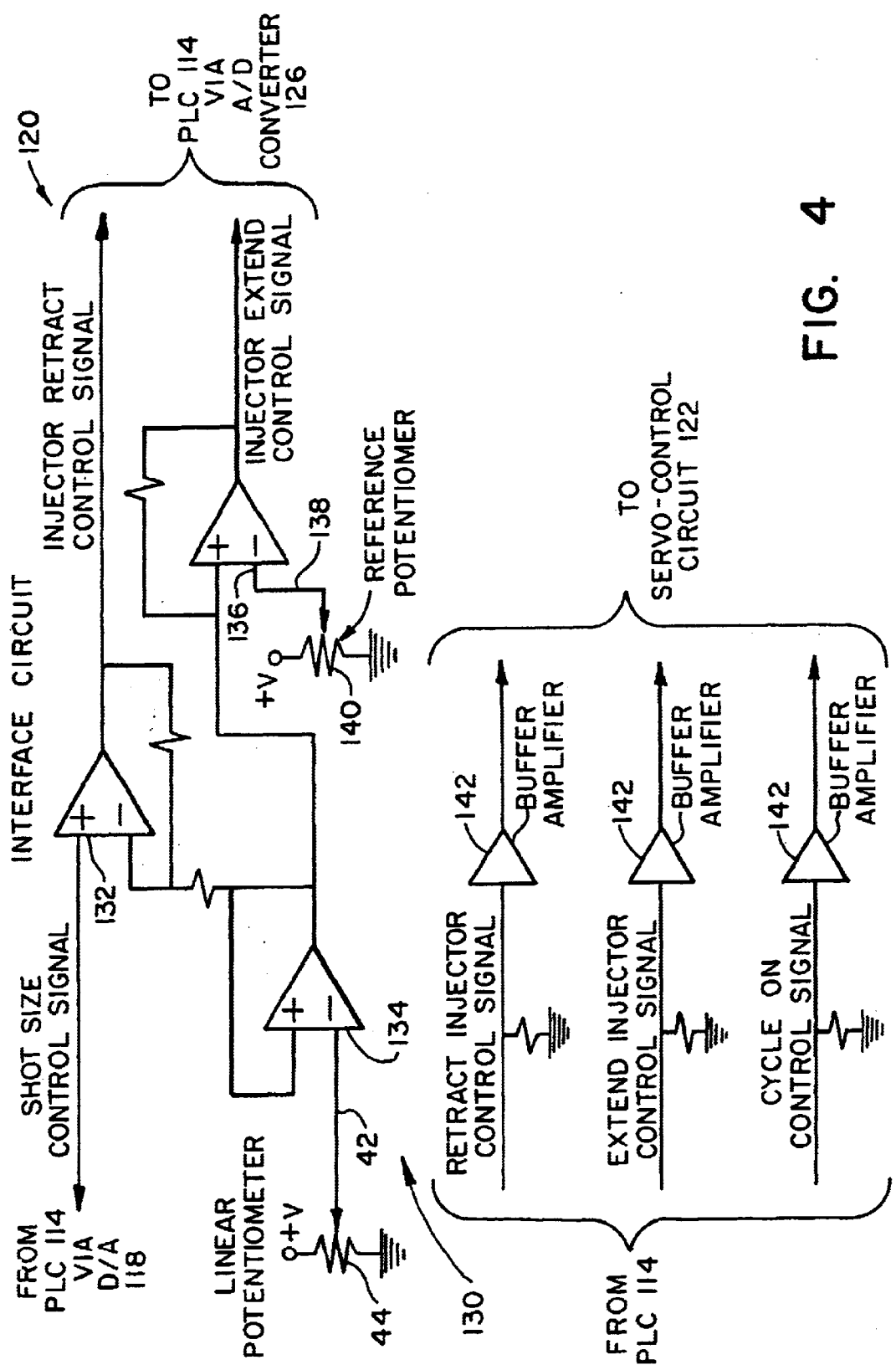
FIG. 4 is a schematic diagram of the interface circuit shown in FIG. 3.
Figure 5A:
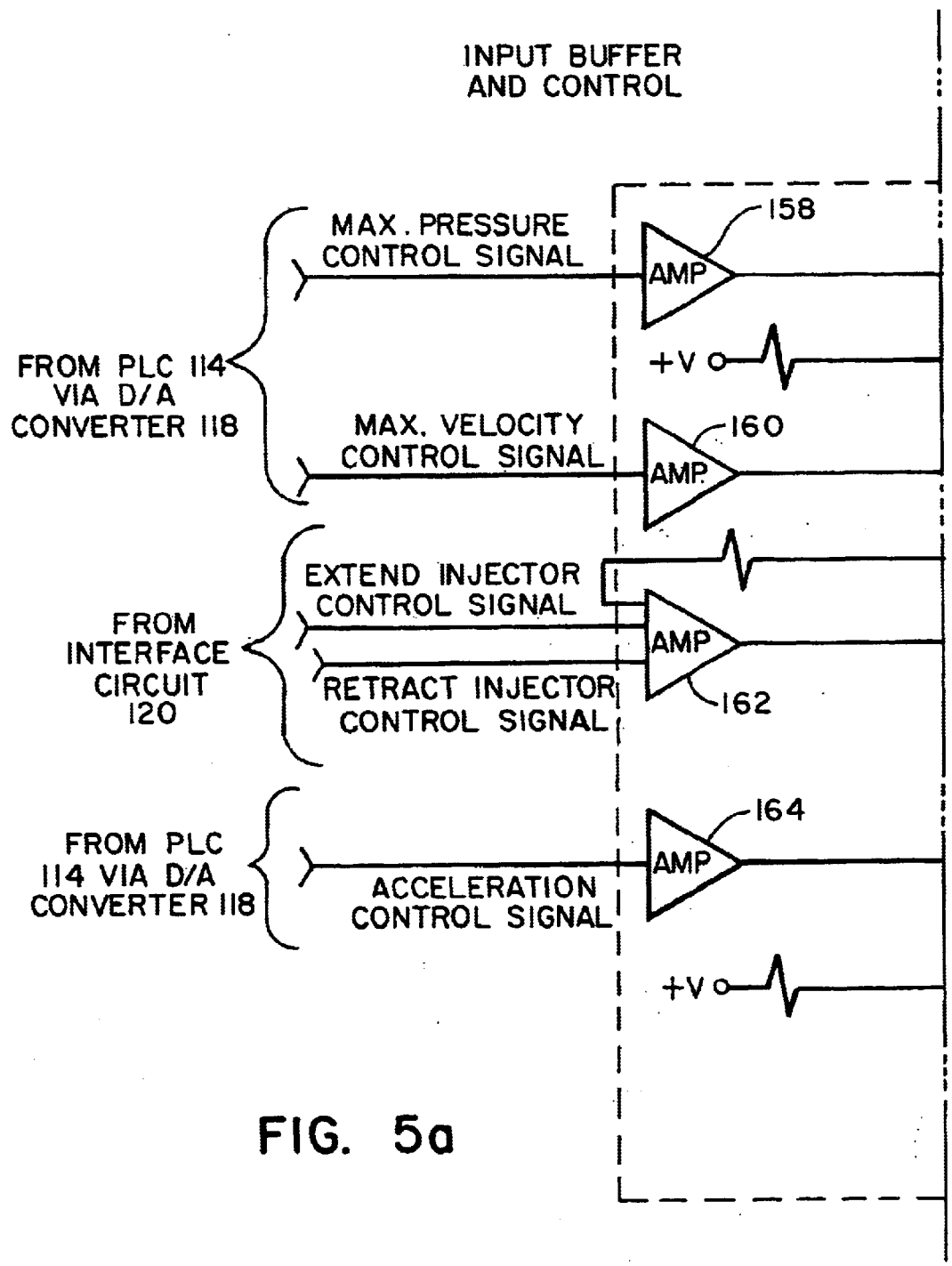
FIGS. 5a–5d is a schematic diagram of the servo control circuit shown in FIG. 3.
Figure 5B:
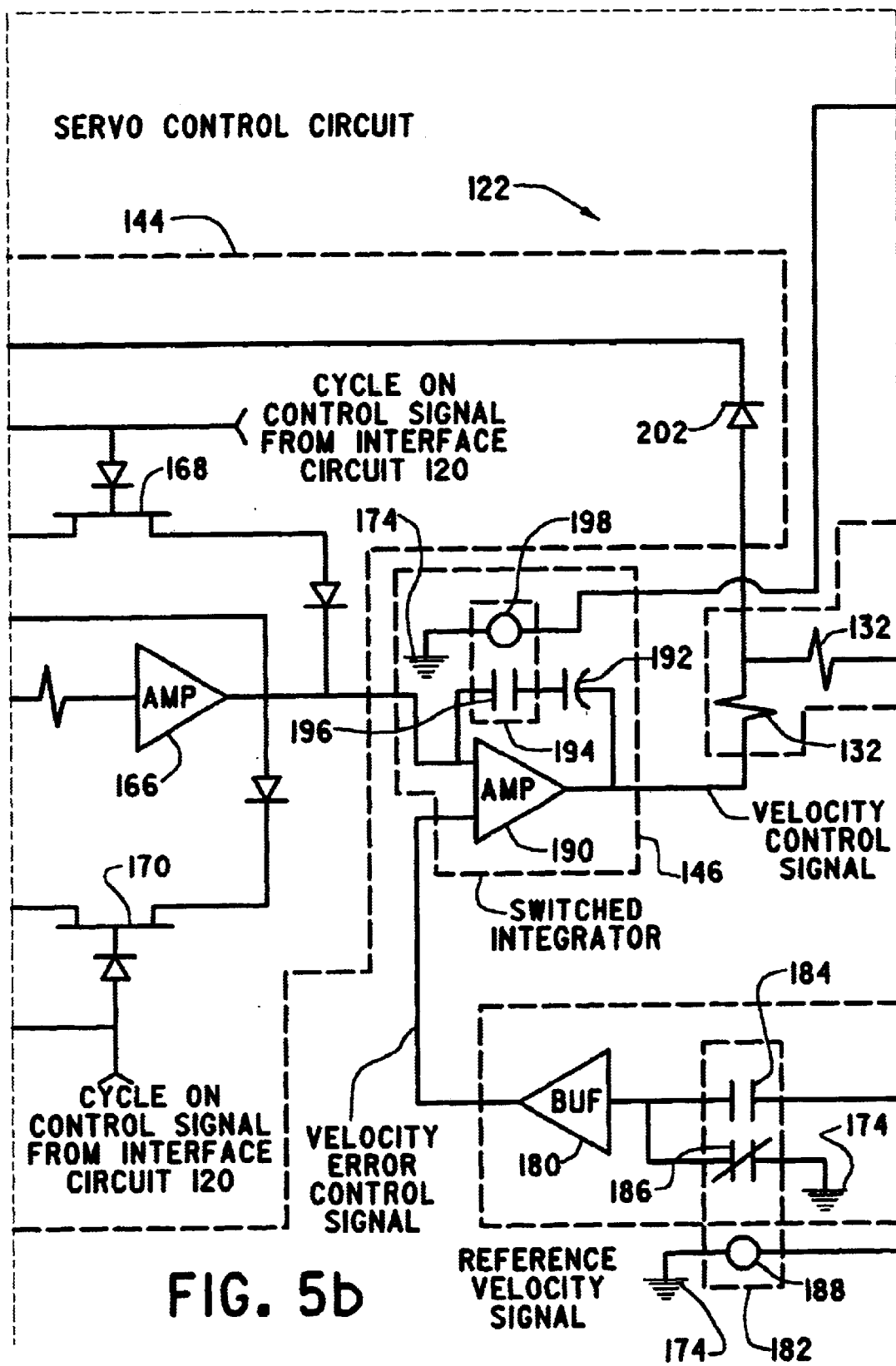
Figure 5C:
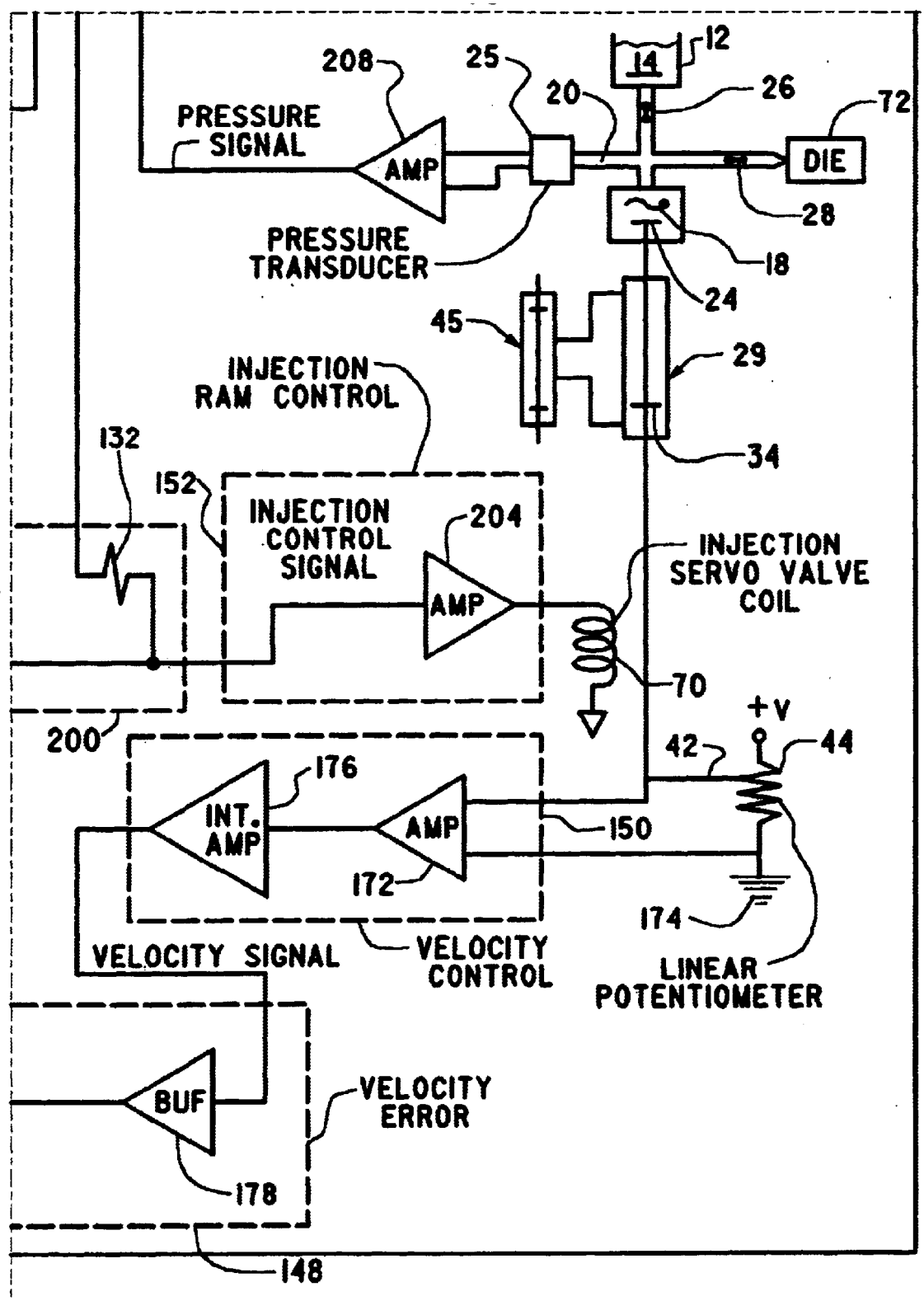
Figure 5D:
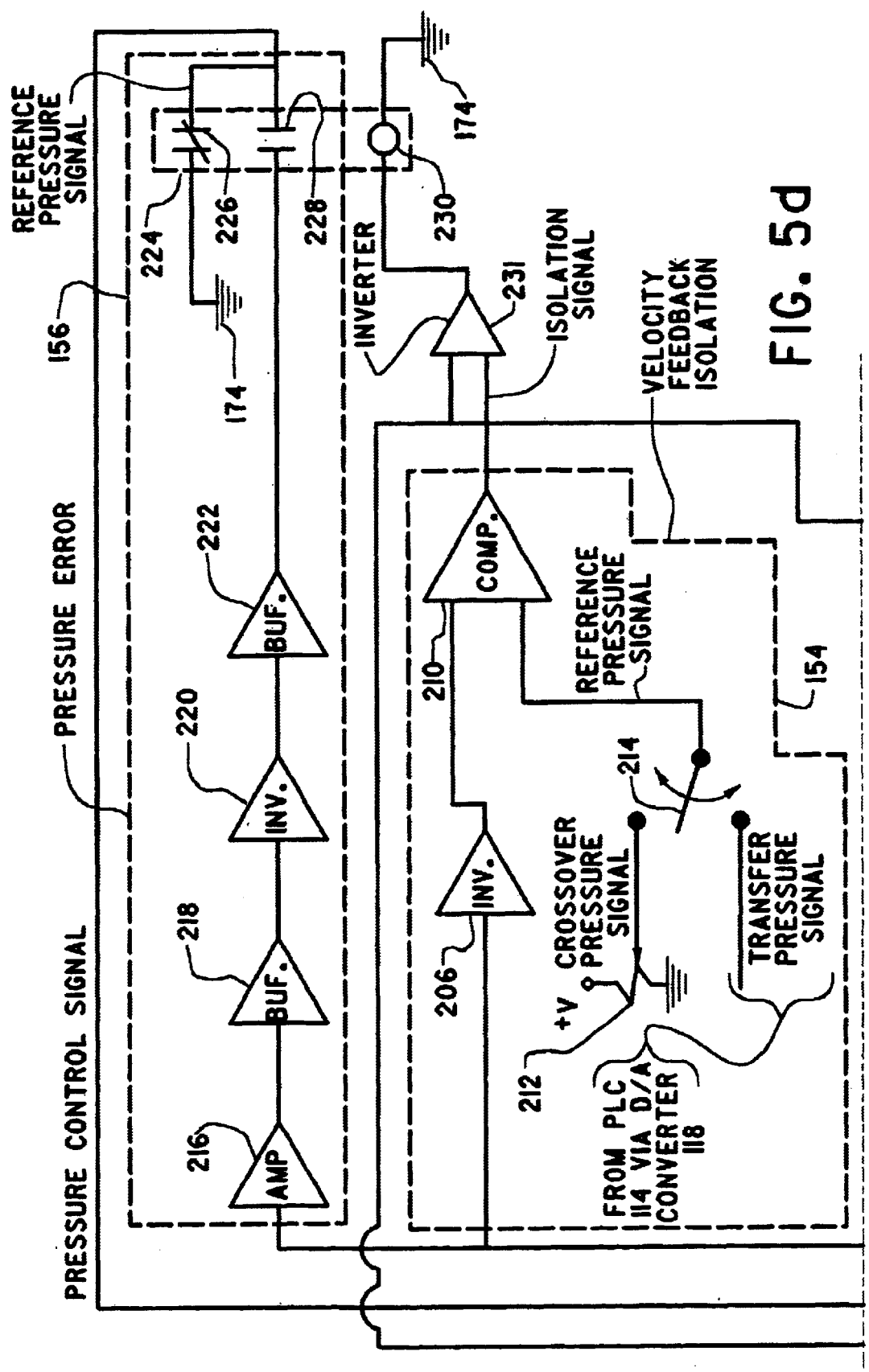

With reference to FIG. 4, interface circuit 120 includes a shot size control circuit 130 which includes a first input 132 connected to receive a shot size control signal from PLC 114 via D/A 118, a second input 134 connected to slider arm 42 and a third input 136 connected to a slider arm 138 on a reference potentiometer 140. The shot size control signal is an analog signal generated by D/A 118 under the control of PLC 114. PLC 114 controls the amplitude of the shot size control signal in a manner known in the art. The shot size control signal and a voltage received at third input 136 from reference potentiometer 140 cause shot size control circuit 130 to generate an injector retract control signal and an injector extend control signal as a function of the voltage received at second input 134 from linear potentiometer 44 during an injection cycle of injection ram 124. The injector retract control signal and the injector extend control signal are supplied to A/D converter 126 for conversion into digital signals for processing by PLC 114.

Interface circuit 120 also includes a plurality of buffer amplifiers 142 for buffering various control signals received from PLC 114 and supplying the buffered control signals to servo control circuit 122. These buffered control signals include a retract injector control signal, an extended injector control signal and a cycle ON control signal.

With reference to FIGS. 5a–5d and with continuing reference to all previous Figures, servo control circuit 122 includes an input buffer and control circuit 144, a switched integrator 146, a velocity error circuit 148, a velocity control circuit 150, an injection ram control circuit 152, a velocity feedback isolation circuit 154 and a pressure error circuit 156. Input buffer and control circuit 144 includes amplifiers 158–166 and transistor switches 168 and 170 configured to receive and combine various control signals supplied to input buffer and control circuit 144 under the control of PLC 114. More specifically, input buffer and control circuit 144 receives a maximum velocity control signal, an acceleration control signal and a maximum pressure control signal from D/A converter 118 under the control of PLC 114. The amplitudes of the maximum velocity control signal and the acceleration control signal are controlled by PLC 114 to cause servo control circuit 122 to control the maximum velocity and acceleration of injection ram 24. The maximum pressure control signal is controlled by PLC 114 to cause servo control circuit 122 to control the maximum pressure injection ram 24 exerts on fluid molding material 14 received in die 72. Input buffer and control circuit 144 also receives the extend injector control signal, the retract injector control signal and the cycle ON control signal from PLC 114 via buffer amplifiers 142 of interface circuit 120.

Velocity control circuit 150 includes an amplifier 172 connected to receive a position signal from linear potentiometer 44. This position signal is a voltage across linear potentiometer 44 and, more specifically, the voltage between slider arm 42 and a reference voltage or ground 174 between which linear potentiometer 44 is connected. Amplifier 172 has an output connected to an input of an integrating amplifier 176 of velocity control loop 150. Integrating amplifier 176 integrates the signal received from amplifier 172 and outputs the integrated signal as a velocity signal to velocity error circuit 148.

Velocity error circuit 148 includes buffer amplifiers 178 and 180 connected in series between an input and an output of velocity error circuit 148. Velocity error circuit 148 also includes a switch 182 having a normally open contact 184 and a normally closed contact 186. Switch 182 also includes a coil 188 which is responsive to an isolation signal output by velocity feedback isolation circuit 154 for controlling the states of contacts 184 and 186.

Normally open contact 184 is connected in series between an output of buffer amplifier 178 and an input of buffer amplifier 180. Normally closed contact 186 is connected in series between reference voltage or ground 174 and the input to buffer amplifier 180. By selectively controlling the states of contacts 184 and 186, the input of buffer amplifier 180 can be connected to receive the buffered velocity signal output by buffer amplifier 178 or can be connected to a reference velocity signal, namely reference voltage or ground 174. Depending upon the states of contacts 184 and 186, buffer amplifier 180 outputs a velocity error control signal which is the reference voltage or ground 174 or the buffered velocity signal output by buffer amplifier 178.

Switched integrator 146 includes a difference amplifier 190 having one input connected to an output of input buffer and control circuit 144 and another input connected to receive the velocity error control signal from velocity error circuit 148. An integrating capacitor 192 is connected between an output of amplifier 190 and the input of amplifier 190 connected to receive the output of input buffer and control loop 144.

Switched integrator 146 includes a switch 194 having a normally open contact 196 connected in series with capacitor 192. Switch 194 also includes a coil 198 responsive to the isolation signal output by velocity feedback isolation circuit 154 for controlling the state of contact 196. Amplifier 190 outputs a velocity control signal which is either the integral of the difference of the voltages received at the inputs of amplifier 190 when contact 196 is in its closed state or is a buffered reference that is driven to zero current as a function of the voltages received at the inputs of amplifier 190 when contact 196 is in its open state.

The output of switched integrator 146 and the output of pressure error circuit 156 are connected to a summing junction 200. An output of amplifier 158 of input buffer and control loop 144 is also connected to summing junction 200 via a diode 202. Summing junction 200 combines the velocity control signal output by switched integrator 146, the amplified maximum pressure control signal output by amplifier 158, and the pressure control signal output by pressure error circuit 156 to form an injection control signal which is supplied to injection ram control circuit 152.

Injection ram control circuit 152 includes an amplifier 204 for amplifying the injection control signal and supplying the amplified injection control signal to injection servo coil 70 for controlling the movement of injection ram 24 during an injection cycle.

Velocity feedback isolation circuit 154 includes an inverter 206 having an input connected to receive a pressure signal output by an amplifier 208 in response to the inputs of amplifier 208 receiving the signal output by pressure transducer 25 during an injection cycle. Inverter 206 inverts the received pressure signal and outputs an inverted pressure signal.

Velocity feedback isolation circuit 154 also includes a comparator 210 having one input connected to an output of an inverter 206, another input connected to receive a reference pressure signal and an output which can be latched/unlatched under the control of the cycle ON control signal from PLC 114 via interface circuit 120. This reference pressure signal can either be a transfer pressure signal output by D/A converter 118 under the control of PLC 114 or a crossover pressure signal received from a user adjustable potentiometer 212. A user adjustable switch 214 can be utilized to select the crossover pressure signal or the transfer pressure signal to be the reference pressure signal supplied to comparator 210.

Comparator 210 compares the inverted pressure signal to the reference pressure signal and outputs the isolation signal as a function thereof. More specifically, when the reference pressure signal is greater than the inverted pressure signal the isolation signal is in one binary state. In contrast, when the inverted pressure signal received is greater than the reference pressure signal the isolation signal is in its other binary state.

Pressure error circuit 156 includes an amplifier 216, a buffer 218, an inverter 220 and a buffer 222 connected in series for processing the pressure signal output by amplifier 208. Pressure error circuit 156 also includes a switch 224 having a normally close contact 226 and a normally open contact 228 under the control of an energizing coil 230. Coil 230 is connected to receive the isolation signal from velocity feedback isolation circuit 154 via an inverter 231. The isolation signal controls the states of contacts 226 and 228 of switch 224.

With ongoing reference to FIGS. 5a–5d and with reference back to back to FIG. 1, the operation of servo control circuit 122 will now be described. Initially, velocity feedback isolation circuit 154 outputs the isolation signal which energizes coil 188 of switch 182 whereupon normally open contact 184 changes to its closed state and normally closed contact 186 changes to its open state. With contact 184 in its closed state, the velocity signal output by velocity control circuit 150 is buffered by buffer amplifiers 178 and 180 and output to switched integrator as the velocity error control signal.

The isolation signal output by velocity feedback isolation circuit 154 also energizes coil 198 of switch 194 whereupon normally open contact 196 changes to its closed state connecting capacitor 192 between the output of amplifier 190 and the input of amplifier 190 connected to receive the output of input buffer and control circuit 144.

Lastly, the isolation signal output by velocity feedback isolation circuit 154 energizes coil 230 via inverter 231 whereupon contact 226 remains in its normally closed state and contact 228 remains in its normally open state. When contact 226 is in its normally closed state, the pressure control signal output by pressure error circuit 156 is a pressure reference signal, such as reference voltage or ground 174. This pressure reference signal is related to a zero or atmospheric pressure of fluid molding material 14 in die 72.

Next, input buffer and control circuit 144 receives input signals which cause hydraulic control system 45 to retract injection ram 24 with valve 26 open and with valve 28 closed whereupon fluid molding material 14 is drawn into chamber 18 and channel 20. PLC 114 controls the control signals input into input buffer and control circuit 144 to retract injection ram 24 whereupon the volume of fluid molding material received in chamber 18 corresponds to the volume of fluid molding material needed to fill mold die 72 during the injection cycle. More specifically, the extent injection ram 24 is retracted is related to the shot size control signal input into second input 134 of shot size control circuit 130 shown in FIG. 4.

Prior to initiating the injection cycle, switch 214 is switched to a desired position whereupon the reference pressure signal corresponds to the set point pressure signal or the transfer pressure signal.

Next, PLC 114 causes various control signals to be received at the inputs of input buffer and control circuit 144 to initiate a first part of the injection cycle with contacts 184, 196 and 226 of switches 182, 194 and 224 in their closed states. More specifically, the velocity error control signal output by velocity error circuit 148 is the buffered velocity signal output by velocity control circuit 150 and the pressure control signal output by pressure error circuit 156 is the reference pressure signal, namely, reference voltage or ground 176. Thus, during the first part of the injection cycle, injection ram 24 is controlled as a function of the actual velocity of injection ram 24, but without reference to the actual pressure of fluid molding material 14 in die 72.

Amplifier 190 coacts with capacitor 192 connected in feedback across amplifier 190 to integrate the difference between the velocity error control signal received at one input of amplifier 190 from velocity error circuit 148 and the output of input buffer and control circuit 144 received at the other input of amplifier 190 to produce the velocity control signal. This velocity control signal is combined with the amplified maximum pressure control signal output by amplifier 158 and the pressure control signal output by pressure error circuit 156 to form the injection control signal received by injection ram control circuit 152. As shown in FIGS. 5a–5d, summing junction 200 includes isolation resistors 132 which enable the various control signals received at summing junction 200 to be combined to form the injection control signal.

During the first part of the injection cycle, switched integrator 146 is operating in an integrating mode whereupon the velocity control signal is the integral of the difference between the velocity error control signal and the output of input buffer and control circuit 144. With switched integrator 146 operating in the integrating mode, switched integrator 146 coacts with velocity control circuit 150, velocity error circuit 148, injection ram control circuit 152, and pressure error circuit 156 to cause servo control circuit 122 to be responsive to the control signals received at the inputs of input buffer and control circuit 144 for implementing an integral only control mode of operation for controlling the extension of injection ram 24.

During the extension of injection ram 24, velocity control circuit 150 and, more specifically, integrating amplifier 176 outputs the velocity signal which is related to a time rate of change of the position of injection ram 24 as determined via the changing position of slider arm 42 on linear potentiometer 44.

Figure 6:
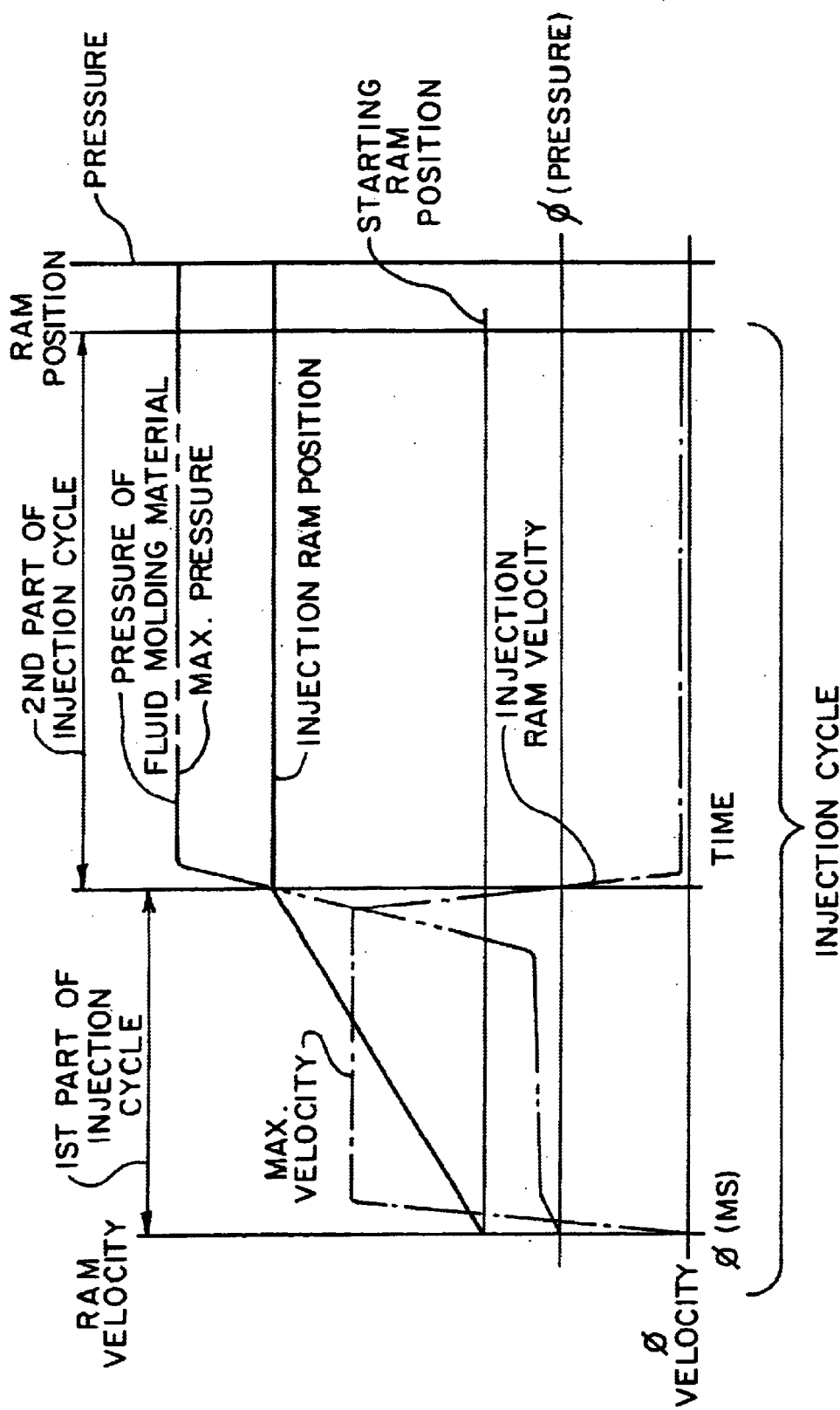
FIG. 6 shows graphs of fluid molding material pressure, injection ram position and injection ram velocity for an injection cycle.

With reference to FIG. 6 and with continuing reference to FIGS. 1 and 5, during the first part of the injection cycle, when die 72 is initially being filled with fluid molding material 14, injection ram 24 initially accelerates, with an acceleration related to the acceleration control signal received by input buffer and control circuit 144, to a maximum velocity related to the maximum velocity control signal received by input buffer and control circuit 144.

During the initial portion of the first part of the injection cycle, pressure transducer 25 detects little or no pressure of fluid molding material 14 in fluid channel 20. However, as die 72 fills with injection molding material 14, the pressure of fluid molding material 14 in fluid channel 20 increases, whereupon pressure transducer 25 and amplifier 208 coact to output the pressure signal which is related to the pressure of fluid molding material 14 in die 72. When the pressure signal increases in value sufficiently such that the inverted pressure signal received at the input of comparator 210 from inverter 206 has a predetermined relation to the reference pressure signal, comparator 210 changes the state of the isolation signal thereby signaling a transition from the first part of the injection cycle to a second part of the injection cycle. In response to the isolation signal changing state, the contacts of switches 182, 194 and 224 change state. More specifically, when the level of the pressure signal output by amplifier 208 increases sufficiently, the isolation signal output by velocity feedback isolation circuit 154 changes state whereupon contacts 184 and 186 of relay 182 assume their normally open and normally closed states, respectively; contact 196 of switch 194 assumes its normally opened state; and contacts 226 and 228 of switch 224 assume an open state and a closed state, respectively.

When contacts 184 and 186 of switch 182 change state in response to the change in state of the isolation signal, the velocity error control signal output by velocity error circuit 148 changes its reference from the velocity signal output by velocity control circuit 150 to the reference velocity signal, namely reference voltage or ground 174. This reference velocity signal is related to a zero velocity of injection ram 24 and, hence, fluid molding material 14. Thus, in the second part of the injection cycle, the actual velocity of injection ram 24 is not utilized to control the pressure injection ram 24 exerts on fluid molding material injected into die 72.

Opening contact 196 of relay 194 disconnects capacitor 192 from feedback across amplifier 190 of switched integrator 146. This causes switched integrator 146 to switch from an integral mode of operation to a buffered reference mode of operation whereupon the velocity control signal is driven to zero current as a function of the voltages received at the inputs of amplifier 190. At the same time, opening contact 184 of switch 182 isolates integrating amplifier 176 of velocity control circuit 150 from switched integrator 146. Thus, in the second part of the injection cycle, servo control circuit 122 implements a proportional only control mode for controlling injection ram 24.

Switching the states of contacts 226 and 228 of switch 224 causes the pressure control signal output by pressure error circuit 156 to change its reference from the reference pressure signal, namely, reference voltage or ground 176, to the pressure signal output by amplifier 208. Thus, in the second part of the injection cycle, the pressure control signal is related to the actual pressure of fluid molding material 14 in die 72. Summing junction 200 combines the velocity error control signal, the pressure control signal and the amplified maximum pressure control signal output by amplifier 158 to form the injection control signal which proportionally controls the pressure injection ram 24 exerts on fluid molding material 14 during the second part of the injection cycle.

After a suitable curing period, the second part of the injection cycle is terminated and die 72 is separated from injection nozzle 22. Thereafter, PLC 114 causes appropriate control signals to be supplied to inputs of input buffer and control circuit 144 to retract injector ram 24 in preparation for another injection cycle.

As shown in FIG. 6, the velocity of injection ram 24 decreases to substantially zero velocity when the second part of the injection cycle is initiated. Moreover, the pressure of the fluid molding material is relatively low during the first part of the injection cycle and increases rapidly near the end of the first part of the injection cycle to a maximum pressure adjacent the beginning of the second part of the injection cycle.

As can be seen, servo control circuit 122 is responsive to control signals generated by PLC 114 for controlling injection ram 24. Servo control circuit 122 implements an integral only control mode which controls only a velocity of injection ram 24 during the first part of the injection cycle and a proportional only control mode which controls only a pressure exerted by injection ram 24 on the fluid molding material 14 during the second part of the injection cycle.

During the first part of the injection cycle, when die 72 is initially being filled with fluid molding material 14, servo control circuit 122 is responsive to the actual velocity signal and the reference pressure signal, but not the actual pressure signal output by amplifier 208, for causing injection ram 24 to inject fluid molding material 14 into die 72 at a velocity related to the actual velocity signal output by velocity control circuit 150. During the second part of the injection cycle, when die 72 is substantially filled with fluid molding material 14, servo control circuit 122 is responsive to the actual pressure signal output by amplifier 208 and the reference velocity signal, but not the actual velocity signal output by velocity control circuit 150, for causing injection ram 24 to maintain the pressure of fluid molding 14 at a pressure related to the actual pressure signal output by amplifier 208.

The invention has been described with reference to the preferred embodiment. Obvious modifications and alterations will occur to others upon reading and understanding the preceding detailed description. It is intended that the invention be construed as including all such modifications and alterations insofar as they come within the scope of the appended claims or the equivalents thereof.

I claim:

1. An injection molding apparatus comprising:

means for injecting fluid molding material into a die; and a control system for controlling the means for injecting, the control system including:

a programmable logic controller for generating control signals; and a closed loop servo control circuit responsive to the control signals for implementing an integral only control mode for controlling in real time a velocity of the injecting means during injection of fluid molding material into the die under velocity only feedback control or a proportional only control mode for controlling in real time the pressure the injecting means applies to the fluid molding material in the die under pressure only feedback control during an injection cycle wherein, during a first part of the injection cycle the servo control circuit operates in the only control mode and during a second part of the injection cycle, that is contiguous with the first part of the injection cycle, the servo control circuit operates in the only control mode.

2. The apparatus as set forth in claim 1, further including:

means for determining a pressure of the fluid molding material during the injection cycle and for outputting an actual pressure signal indicative thereof; and means for determining a velocity of the fluid molding material during the injection cycle and for outputting an actual velocity signal indicative thereof, wherein:

during the first part of the injection cycle, when the die is initially being filled with the fluid molding material, the servo control circuit is responsive to the actual velocity signal and a reference pressure signal for causing the injecting means to control a velocity the fluid molding material is injected into the die without reference to the actual pressure signal; and during the second part of the injection cycle, when the die is substantially filled with the fluid molding material, the servo control circuit is responsive to the actual pressure signal and a reference velocity signal for causing the injecting means to control a pressure of the fluid molding material in the die without reference to the actual velocity signal.

3. The apparatus as set forth in claim 2, wherein:

the reference pressure signal is a first reference voltage; and the reference velocity signal is a second reference voltage.

4. The apparatus as set forth in claim 2, wherein the servo control circuit includes:

a velocity feedback isolation circuit responsive to the actual pressure signal for outputting an isolation signal that changes binary state between the first and second parts of the injection cycle;

a pressure error circuit responsive to the isolation signal and the pressure signal for outputting a pressure control signal;

a velocity error circuit responsive to the isolation signal and the actual velocity signal for outputting a velocity error control signal; and an injection ram control circuit responsive to the velocity error control signal and the pressure control signal for controlling a velocity the fluid molding material is injected into the die and/or a pressure of the fluid molding material.

5. The apparatus as set forth in claim 4, wherein:
the isolation signal changes binary state when, during the injection cycle, the actual pressure signal achieves a predetermined relation to a reference pressure signal; and in response to the isolation signal changing state, the pressure control signal changes from a first reference voltage to a voltage related to the actual pressure signal and the velocity error control signal changes from a voltage related to the actual velocity signal to a second reference voltage.

6. The apparatus as set forth in claim 5, wherein at least one of the first and second reference voltages is electrical ground.

7. The apparatus as set forth in claim 4, further including a switched integrator responsive to the velocity error control signal and the isolation signal for outputting a velocity control signal which is mathematically integrally related to the velocity error control signal during the first part of the injection cycle and which is mathematically proportionally related to the velocity error control signal during the second part of the injection cycle.

8. The apparatus as set forth in claim 2, wherein:
the injecting means includes an injection ram for injecting the fluid molding material into the die; and the velocity determining means includes a linear potentiometer having a slider arm coupled to the injection ram for movement therewith and a velocity control circuit connected to the linear potentiometer and responsive to movement of the slider arm for outputting the actual velocity signal related to a velocity of the injection ram.

9. An injection molding apparatus comprising a moveable injection ram for urging fluid molding material into a die, the movement of the injection ram being controlled by a software controlled controller and a closed loop servo control circuit which senses movement of the injection ram and a pressure of the fluid molding material in response to the injection ram urging the fluid molding material into the die during an injection cycle, the servo control circuit responsive to the controller for implementing an integral only control mode for controlling a velocity of the injection ram during a first part of the injection cycle under velocity only feedback control and for implementing a porportional only control mode for controlling the pressure the injection ram exerts on the fluid molding material during a second part of the injection cycle, that is contiguous with the first part of the injection cycle, under pressure only feedback control.

10. The apparatus as set forth in claim 9, wherein:
during the first part of the injection cycle, the servo control circuit controls the velocity of the injection ram with reference to a reference pressure signal corresponding to zero or substantially zero pressure of the fluid molding material; and during the second part of the injection cycle, the servo control circuit controls the pressure the injection ram exerts on the fluid molding material with reference to a reference velocity signal corresponding to zero or substantially zero velocity of the injection ram.

11. The apparatus as set forth in claim 9, wherein the servo control circuit includes a switched integrating circuit which is controlled to operate in an integral only control mode during the first part of the injection cycle and which is controlled to operate in a buffered reference mode during the second part of the injection cycle.

12. The apparatus as set forth in claim 9, wherein the servo control circuit includes means responsive to a pressure of the fluid molding material and a pressure reference signal for causing the servo control circuit to change from the first part of the injection cycle to the second part of the injection cycle when the pressure of the fluid molding material achieves a predetermined relation to a pressure related to the pressure reference signal.

13. An injection molding apparatus comprising:
means for injecting fluid molding material into a die; and
a control system for controlling the means for injecting during an injection cycle, the control system including:
a controller for generating control signals; and
a closed loop servo control circuit responsive to the control signals for controlling the injecting means, in real time, the servo control circuit implementing an integral control mode which controls a velocity of the injecting means during a first part of the injection cycle under velocity only feedback control and a proportional control mode which controls the pressure exerted by the injecting means on the fluid molding material during a second part of the injection cycle, that is contiguous with the first part of the injection cycle, under pressure only feedback control.

14. The apparatus as set forth in claim 13, further including:
means for determining a pressure of the fluid molding material during the injection cycle and for outputting an actual pressure signal indicative thereof;

means for determining a velocity of the fluid molding material into the die and for outputting an actual velocity signal indicative thereof;

means for generating a reference pressure signal corresponding to zero or substantially zero pressure of the fluid molding material during the injection cycle; and means for generating a reference velocity signal corresponding to zero or substantially zero velocity of the fluid molding material during the injection cycle, wherein:

during the first part of the injection cycle, when the die is initially being filled with the fluid molding material, the servo control circuit is responsive to the actual velocity signal and the reference pressure signal, but not the actual pressure signal, for causing the injecting means to inject the fluid molding material into the die at a velocity related to the actual velocity signal; and during the second part of the injection cycle, when the die is substantially filled with the fluid molding material, the servo control circuit is responsive to the actual pressure signal and the reference velocity signal, but not the actual velocity signal, for causing the injecting means to maintain the pressure of the fluid molding material at a pressure related to the actual pressure signal.

15. The apparatus as set forth in claim 14, wherein:
the servo control circuit includes a switched integrator responsive to the actual velocity signal during the first part of the injection cycle and the reference velocity signal during the second part of the injection cycle for controlling the injecting means during the injection cycle; and the switched integrator switches between an integrating mode during the first part of the injection cycle and a buffered reference mode during the second part of the injection cycle.

16. The apparatus as set forth in claim 15, wherein:

the injecting means includes an injection ram which injects fluid molding material into the die; and the actual velocity signal is related to a time rate of change of the position of the injection ram.

17. The apparatus as set forth in claim 14, wherein the servo control circuit includes a velocity feedback isolation circuit responsive to the actual pressure signal and an external reference pressure signal for causing the servo control circuit to change from the first part of the injection cycle to the second part of the injection cycle when the actual pressure signal during the injection cycle achieves a predetermined relation to the external reference pressure signal.

18. The apparatus as set forth in claim 17, wherein the servo control circuit includes a pressure error circuit responsive to the actual pressure signal and the response of the velocity feedback isolation circuit to the actual pressure signal and the external reference pressure signal for outputting a pressure control signal related to the actual pressure signal or the external reference pressure signal.

19. An injection molding apparatus comprising:

means for injecting fluid molding material into a die; and a control system for controlling the means for injecting, the control system including:

a programmable means for generating control signals; and a closed loop feedback control circuit responsive to the control signals for implementing an integral only control mode that operates under velocity only feedback control or a proportional only control mode that operates under pressure only feedback control for controlling the injecting means during an injection cycle wherein, during a first part of the injection cycle, when the die is being filled with molding material, the feedback control circuit operates in the integral only control mode and during a second part of the injection cycle, that is contiguous with the first part of the injection cycle, when the molding material is solidifying, the servo control circuit operates in the proportional only control mode.

* * * * *